United States Patent
Kuehnis et al.

(10) Patent No.: US 9,948,927 B2
(45) Date of Patent: Apr. 17, 2018

(54) USING AN OPTICAL INTERFACE BETWEEN A DEVICE UNDER TEST AND A TEST APPARATUS

(71) Applicant: Intel Corporation, Santa Clara, CA (US)

(72) Inventors: Rolf H. Kuehnis, Portland, OR (US); Patrik Eder, Taufkirchen (DE)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 15/066,762

(22) Filed: Mar. 10, 2016

(65) Prior Publication Data

US 2017/0264892 A1    Sep. 14, 2017

(51) Int. Cl.

| | |
|---|---|
| G06F 11/00 | (2006.01) |
| H04N 17/00 | (2006.01) |
| G06K 9/03 | (2006.01) |
| G06F 11/22 | (2006.01) |
| G06K 9/20 | (2006.01) |
| G06F 11/07 | (2006.01) |

(52) U.S. Cl.
CPC ....... *H04N 17/004* (2013.01); *G06F 11/2294* (2013.01); *G06K 9/036* (2013.01); *G06K 9/2054* (2013.01); *G06F 11/079* (2013.01)

(58) Field of Classification Search
CPC .................................................. G06F 11/2294
USPC ............................... 714/25, 23, 27, 30, 47.1
See application file for complete search history.

(56) References Cited

U.S. PATENT DOCUMENTS

| | | | |
|---|---|---|---|
| 7,344,080 B2 * | 3/2008 | Vinogradov | G06K 7/14 235/462.11 |
| 9,177,189 B2 | 11/2015 | Saunders et al. | |
| 2003/0142106 A1 * | 7/2003 | Saund | G06K 9/00463 345/582 |
| 2005/0222690 A1 * | 10/2005 | Wang | H04M 1/24 700/17 |
| 2007/0103489 A1 * | 5/2007 | MacInnis | G06T 9/00 345/629 |
| 2012/0223132 A1 | 9/2012 | Lim | |
| 2013/0002862 A1 * | 1/2013 | Waring | H04N 7/18 348/143 |
| 2014/0175163 A1 | 6/2014 | Tankleff et al. | |

OTHER PUBLICATIONS

International Search Report and Written Opinion dated Apr. 25, 2017 for International Application No. PCT/US2017/016012, 17 pages.

* cited by examiner

*Primary Examiner* — Dieu-Minh Le
(74) *Attorney, Agent, or Firm* — Schwabe, Williamson & Wyatt, P.C.

(57) ABSTRACT

Embodiments of the present disclosure provide a method and apparatus for device testing via an optical interface. In one instance, the apparatus may comprise a test controller to operate a camera to generate an image to capture test data displayed on a screen of a device under test. The test controller may be configured to extract the test data from the image, analyze the test data, and generate feedback information for the device under test, based at least in part on a result of the analysis of the test data. The camera may be included in the apparatus and communicatively coupled with the test controller. Other embodiments may be described and/or claimed.

16 Claims, 6 Drawing Sheets

USING AN OPTICAL INTERFACE BETWEEN A DEVICE UNDER TEST AND A TEST APPARATUS

FIELD

Embodiments of the present disclosure generally relate to the field of device testing, and more particularly, to testing a device using an optical interface between a device under test and a test apparatus.

BACKGROUND

Today's computing devices may be equipped with different systems, processes, and applications, which may need testing and debugging at a device production stage or during the device lifetime, in order to develop and maintain intelligent platforms. However, dedicated test features (e.g., special test ports compatible with testing equipment, etc.) may not always be available on a conventional computing device. Further, as computing devices (e.g., mobile devices) become smaller in form factor, it becomes more difficult to find sufficient "real estate" to mount conventional connectors on a device, to enable wired or optical connection between the device and test equipment. In some instances, wireless connections may substitute wired connections for device testing and debugging. However, using wireless connections for device testing may cause some problems typically associated with wireless connectivity, such as privacy and environmental issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include a method and apparatus for device testing via an optical interface. In one instance, the apparatus may comprise the apparatus may comprise a test controller to operate a camera to generate an image to capture test data displayed on a screen of a device under test. The test controller may be configured to extract the test data from the image, analyze the test data, and generate feedback information for the device under test, based at least in part on a result of the analysis of the test data. The camera may be included in the apparatus and communicatively coupled with the test controller. It should be noted that the example embodiments of the present disclosure are described in regard to device testing. However, other possible uses of the described embodiments may be contemplated, such as, for example, using optical interfaces to interrogate and control the states of a device, including an Internet of Things (IoT) device.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other.

Figure 1:
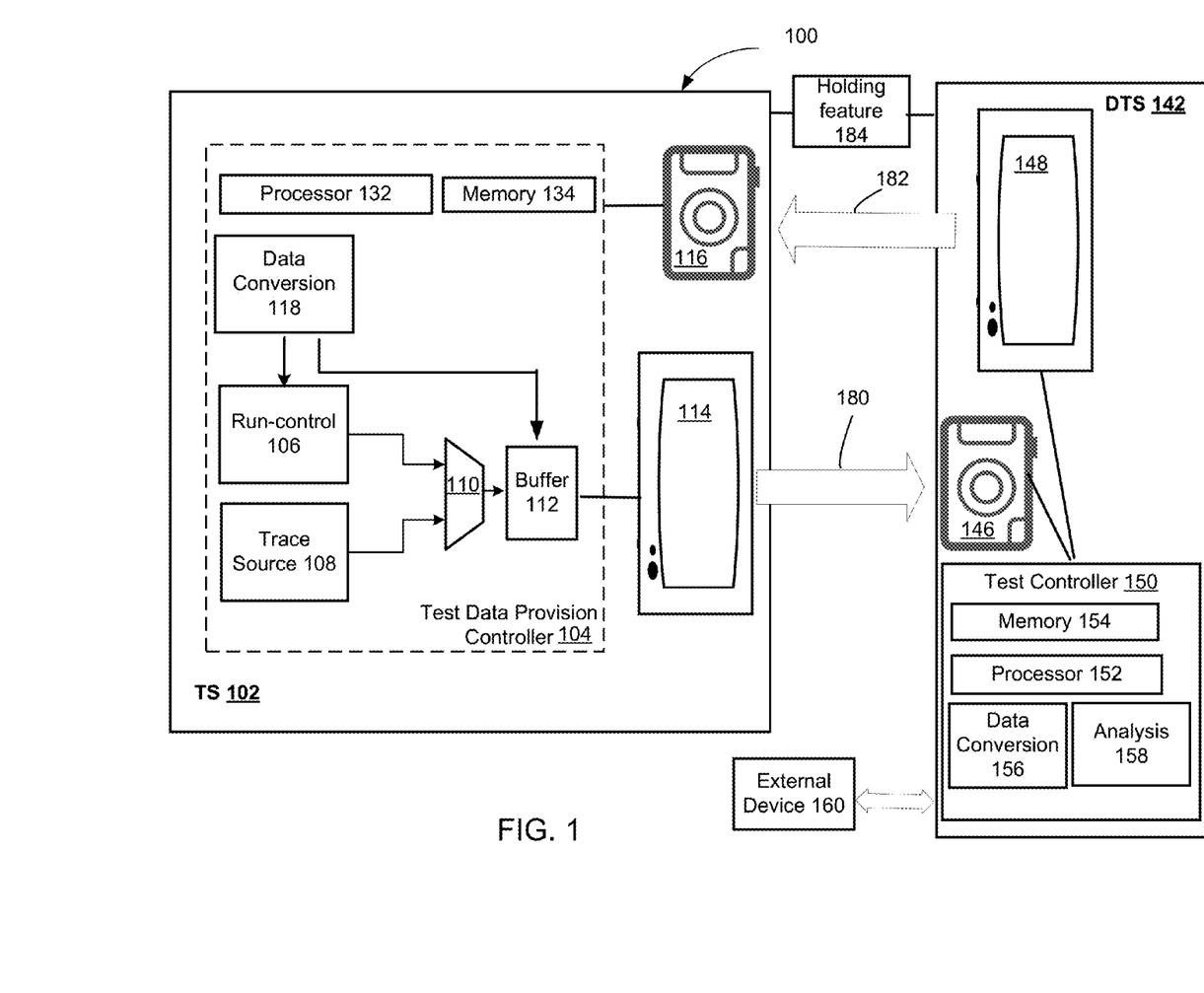
FIG. 1 is a block diagram illustrating an example system for device testing using an optical interface, in accordance with some embodiments.

FIG. 1 is a block diagram illustrating an example system for device testing using an optical interface, in accordance with some embodiments. The example system 100 may include a target system (TS, or device under test) 102 and a debug test system (DTS, or test apparatus for device testing) 142.

In embodiments, the device 102 may comprise a computing device, such as, for example, a mobile device (e.g., a tablet computer, a smartphone, a 2-in-1 computing device, an Internet of Things (IoT) device, and the like), and may include a system on chip (SoC) or other device components to be tested. As will be described below, the apparatus 142 may perform unidirectional testing of the device 102 using at least one optical interface 180. In some embodiments the test apparatus 142 may perform bidirectional testing of the device 102 using optical interface 180 and another optical interface 182 configured to provide test feedback to the device 102. For the illustrated embodiments of FIG. 1 (and remainder of the description), for ease of understanding, optical interfaces 180 and 182 are illustrated (and may be described) as direct optical interfaces between device 102 and apparatus 142. However, the present disclosure is not so limited. In alternate embodiments, optical interfaces 180 and 182 may be indirect optical interfaces through one or more reflective surfaces, e.g., mirrors or direct optical link interfaces, such as fiber.

In embodiments, the device 102 may include a test data provision controller 104. The test data provision controller 104 may include a processor 132 and memory 134 having instructions that, when executed on the processor 132, may cause the processor 132 to perform test data provision and control, in accordance with some embodiments described herein. More specifically, the test data provision controller 104 may include a trace source block 108 configured to provide test data, such as traces described below in detail. The test data provision controller 104 may further include a run-control block 106 configured to control execution of instructions on the processor 132 and manipulation of memory 134 content. For example, run-control block 106 may control a speed and manner of instructions execution, such as stop execution, cause execution to be performed in a single step, cause execution to commence, and so forth. Run-control block 106 may further control memory 134 registers and content, for example, for configuration and update of the trace source block 108. The run-control block 106 and trace source block 108 may be implemented as hardware, software, or a combination thereof.

The device 102 may further include a merge block 110 coupled with the run-control block 106 and trace source block 108, a display buffer 112 coupled with the merge block 110, and display device 114. The run-control block 106 may provide run-control output, and trace source block 108 may provide traces to the merge block 110, to merge the test data together. The merged output data stream, including trace and run-control, may be put into the display buffer 112 in order to appear on a screen of the display device 114. The test data provision controller 104 may include a data conversion block 118 (e.g., image processing unit (IPU) that may be configured to encode the test data to an image pattern (e.g., graphical or textual representation) displayable on the screen 114. In embodiments, the data conversion block 118 may be implemented on a central processing unit (CPU) or graphical processing unit (GPU) (e.g., processor 132). For example, the processor 132 may read the data from the memory 134, translate the data into an image pattern and write the pattern to the display buffer 112 for the display output. In some embodiments, the data conversion block 118 may comprise a dedicated hardware (e.g., direct memory access (DMA)). In some embodiments, the data conversion block 118 may be integrated into the display engine (not shown). In general, the data conversion block 118 may be implemented as software, hardware, or a combination thereof.

The device 102 may further include an image capture device (e.g., camera) 116 configured to capture a test feedback to be provided by the apparatus for device testing 142, as will be described below in greater detail. The camera 116 may comprise an image capturing device configured to generate photo, video, scanned, or other types of images. The device 102 may include other components (not shown) necessary for the functioning of the device 102. These components may include a power supply block and communications interface(s) to enable the device 102 to communicate over one or more wired or wireless network(s) and/or with any other suitable device (e.g., external device 160). The device 102 may include other components that are not described herein for ease of understanding.

The apparatus for device testing 142 may include a camera 146 to generate an image to capture test data displayed on a screen of the device 102. The camera 146 may comprise an image capturing device configured to generate photo, video, scanned, or other types of images. The apparatus 142 may further include a test controller 150 coupled with the camera 146, to extract the test data from the image, analyze the test data, and generate feedback information for the device 102, based at least in part on a result of the analysis of the test data. The apparatus for device testing 142 may include a display device 148 coupled with the test controller 150, to display the feedback information, to be captured by a camera of the device under test.

The test controller 150 may include a processor 152 and memory 154 having instructions that, when executed on the processor 152 (e.g., comprising an image processing unit (IPU)), may cause the processor 152 to perform test data extraction and conversion and to analyze the test data, in accordance with some embodiments described herein. More specifically, the test controller 150 may include a data conversion block 156 configured to extract data from its graphical, visual, or textual representation provided in the image generated by the camera 146 into readable data flow (and vice versa). In some embodiments, the data conversion block 156 may comprise an IPU. The test controller 150 may further include analysis block 158 coupled with the data conversion block 156 and configured to analyze converted test data and generate feedback information, to be provided to the device under test 102. For example, the analysis block 158 may compare the test data to known patterns or visualize the test data content to provide for display on the screen of the test apparatus 142. In embodiments, the test controller 150 may fully process (e.g., convert and analyze) the images received from device under test 102 or may provide the images or decoded test data to a remote host (e.g., external device 160) for further processing.

Based on the analysis of the test data, the test controller 150 (e.g., analysis block 158) may generate feedback information for the device 102. For example, the test controller 150 may generate device under test configuration data, such as to indicate the subsystems of device 102 that may be activated, which traces may be activated and the like. In another example, the test controller 150 may provide configuration of the optical components of the device 102, such as how many pixels to use per bit on the display device 114, refresh rate, etc. In still another example, the test controller 150 may generate input data (e.g., run-control data) to the run-control block 106 of the device 102. The conversion block 156 may encode the feedback information into a displayable format (e.g., graphical or textual representation) and provide the encoded feedback information to be displayed on a screen of the display device 148, to be captured by the camera 116 of the device 102. The data conversion block 108 of the device 102 may extract the feedback information from an image generated by camera 116, analyze the feedback information, and route the feedback information to the run-control block 106, for test data adjustment. In some embodiments, the device 102 and the test apparatus 142 may be physically coupled with a holding feature 184, to enable alignment of the device 102 and the test apparatus 142, described below in reference to FIG. 5.

Figure 2:
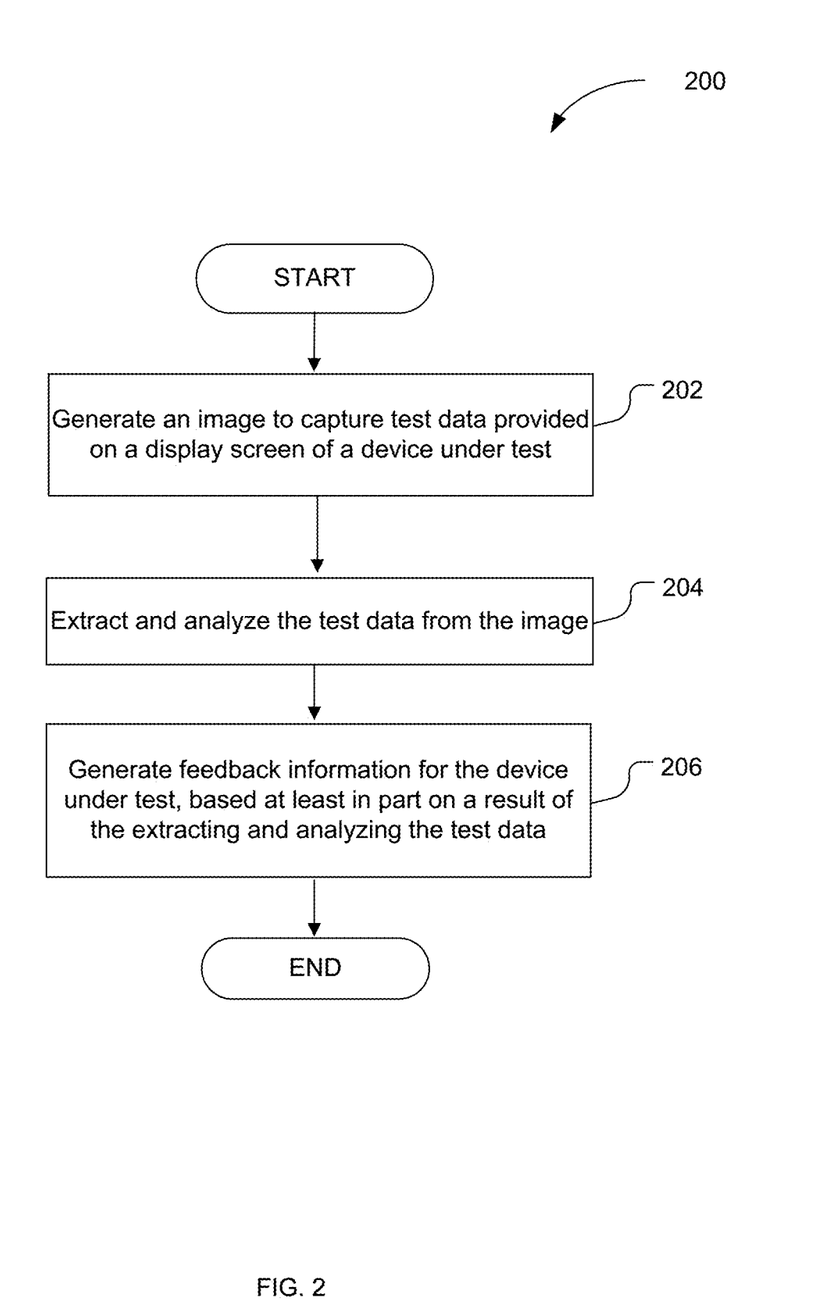
FIG. 2 is an example process flow diagram for device testing using an optical interface, in accordance with some embodiments.

FIG. 2 is an example process flow diagram for device testing using an optical interface, in accordance with some embodiments. The process 200 may comport with embodiments described in reference to FIG. 1. In alternate embodiments, the process 200 may be practiced with more or fewer operations, or a different order of the operations.

The process 200 for testing of a device under test (e.g., device 102) by a test apparatus (e.g., 142) using optical interface between the device and test apparatus may begin at block 202 and include generating an image to capture test data provided on a display screen of a device under test. For example, the camera 146 of the test apparatus 142 may capture a series of frames provided on the screen of the display device 114 of the device under test 102. Each frame may contain a representation of a set of test data. As noted above, the test data may be rendered on the screen of the display device 114 in a variety of forms, such as in graphical representation or textual representation, for example.

The test data may provide information associated with one or more components of the device to be tested. In general, the test data may include error information, to be provided to the test apparatus. As noted above, test data generated by the test data provision controller 104 of the device under test 102 may include different types of traces related to various functionalities of the device 102. Trace data may include text (e.g., in ASCII format) or a compressed or uncompressed binary stream of trace data (e.g., a binary number sent on behalf of a larger textual expression). In embodiments, the test data may be generated by the test data provision controller 104 of the device under test 102 in accordance with a System Trace Protocol (STP) or Trace Wrapper Protocol (TWP) or Narrow Interface for Debug and Test (NIDnT) of a MIPI® Specification. The traces generated according to MIPI® Specification may include software or hardware instrumentation traces.

Software instrumentation traces may comprise message output from instrumented application code. For example, software instrumentation traces may include action logs, error information, warnings, and the like, which may occur in the device under test. These traces may be time stamped in the device under test, and, when delivered to a test apparatus, may provide information about possible errors and their order. The software instrumentation traces may further include different variables, such as field strength, cell information, etc., over time. The software instrumentation traces may further include data that may be inserted by a developer on the device under test side to check that functions of a particular application may be executed as planned.

Hardware instrumentation traces may comprise messages triggered by transactions and events on the SoC infrastructure and other hardware modules of the device under test. Hardware instrumentation traces may provide information on states of the system and its components, which may be reconstructed on the test apparatus side to identify design or process issues in the SoC or the device under test platform.

Traces may further include processor traces, which may comprise highly compressed streams of data, representing instructions and/or instruction flow and/or data and/or data flow that may be executed on the processor. The test apparatus may decompress and generate an instruction flow with timing information, to identify code executed on the device under test processor and the timing of execution, and conduct further analysis of the data. The processor traces may be used to check correctness of instructions executed on the device under test processor, or check execution performance. For example, some real-time functions may be executed in given time intervals. Based on a processor trace, the test apparatus may identify those intervals and upon violating timing generate an error message or warning. The test apparatus may also reconfigure the device under test differently to find the root cause of the timing error.

At block 204, the process 200 may include extracting and analyzing the test data from the generated image. The extraction (e.g., decoding) of the test data out of the image may vary, depending on a type of the test data representation on the screen of the device under test. Some examples of encoding the test data on the TS side and decoding the data on the DTS side are described below in reference to FIGS. 3-4. Analysis of the extracted test data may include, for example, determining whether the test data includes error messages or whether the test data deviates from a predefined data flow that may be accessible by the test apparatus. A deviation from the flow may be identified as an error.

At block 206, the process 200 may include generating feedback information for the device under test, based at least in part on a result of the extracting and analyzing the test data. The feedback information (e.g., control data) may be provided via a screen of the display device 148 to the device under test, to be captured by camera 116. The captured control data may be decoded (e.g., by data conversion block 118) and interpreted by the test data provision controller 104 for further provision of test data. For example, the test apparatus may recognize the error in the test data and cause the device under test (e.g., via the feedback loop described below) to alter its behavior in order to fix the issue or do an execution rerun to get more data to find the root cause of the failure.

In some embodiments, for example, in a non-controlled environment, it may be desirable to have user interaction with the device 102 concurrently with the testing of the device 102. In such instances, only a certain portion, or area, of the display device 114 screen of the device 102 may be used for testing, while a remainder of the screen may be used for user interaction. In these instances, the test controller 150 of the test apparatus 142 may be configured to determine an area on the screen of the device under test 102 in which the test data (e.g., in graphical or textual representation) may be displayed. To conduct such determination, the device under test 102 may be synchronized with the test apparatus 142.

Figure 3:
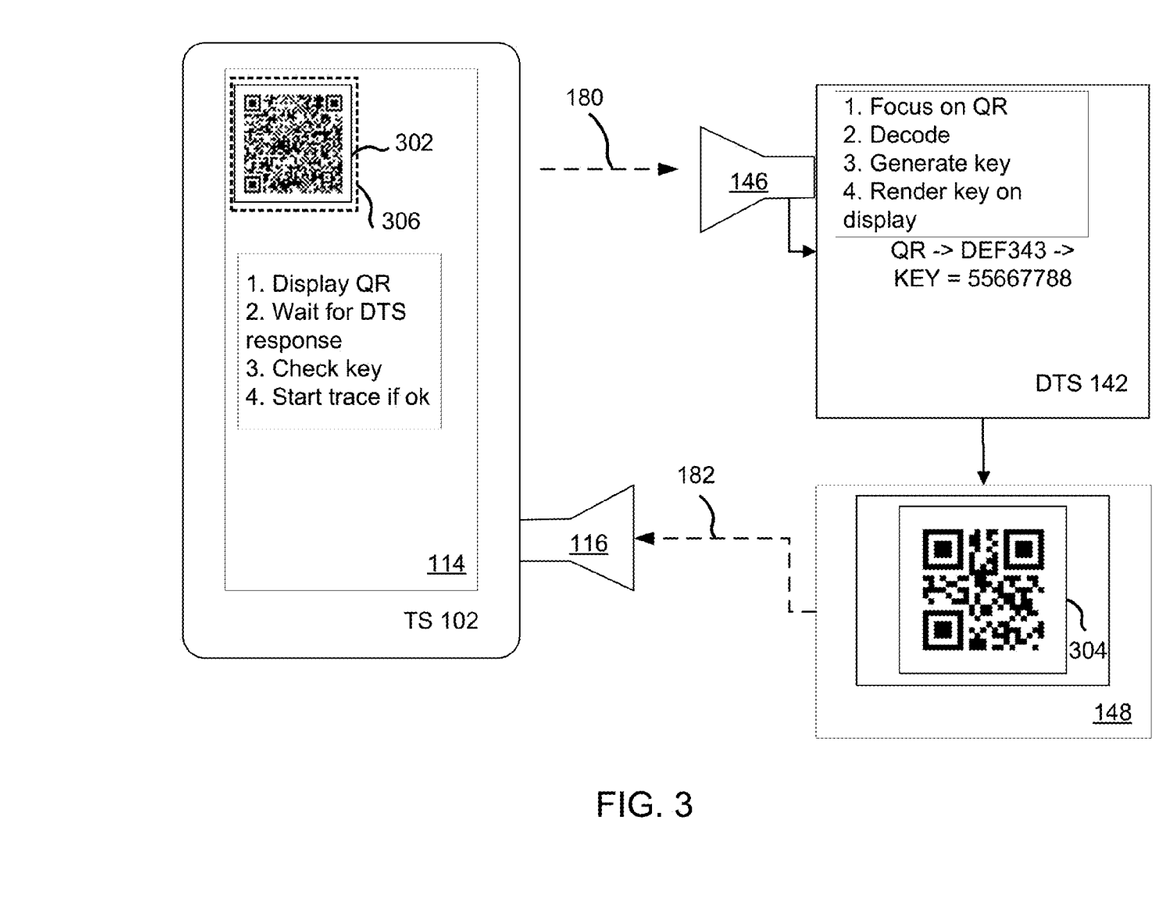
FIG. 3 is an example process flow diagram for synchronizing a device under test with a test apparatus, in accordance with some embodiments.

FIG. 3 is an example process flow diagram for synchronizing a device under test with a test apparatus, in accordance with some embodiments. For ease of understanding, the like components of FIGS. 1 and 3 are numbered with like numerals.

On the TS side, the test data provision controller 104 of the device under test 102 may generate and render for display on the display device 114 screen a graphical representation 302 of a particular data set, such as a quick response (QR) code, in order to synch up with the test apparatus (DTS) 142. The graphical representation 302 of a QR code may be displayed in black and white and may allow for calibration of brightness levels of the display device 114. The QR code graphical representation 302 may occupy a display screen trace output area, such as full screen or a partial screen, such as an area 306 of the screen of the display device 114, as shown. The QR code may include, for example, a secure pass-key or information on the traces enabled on the device 102, to ensure the optical interface 180 between device 102 and test apparatus 142 may be established. After the device 102 displays the graphical representation 302 of the QR code, the device 102 may wait for the response from the test apparatus 142. The response may include a key generated by the test apparatus 142 and provided via the optical interface 182, in response to a receipt of the QR code (similar to a Pretty Good Privacy (PGP) encryption mechanism). Based on the response (e.g., checking the key for correctness), the device 102 may commence the trace generation and rendering for display on the display device 114, to be received and processed by the test apparatus 142.

On the DTS side, the test apparatus 142 may focus the camera 146 on the graphical representation 302 of the QR code displayed on the screen of the display device 114, and generate an image of the QR code. The test apparatus may extract and decode the QR code from the image and generate a key corresponding to the QR code. For example, as shown in FIG. 3, QR code DEF343 may correspond to key 55667788. The test apparatus 142 may render a graphical representation 304 of the key on the screen of the display device 148, to be received, via the optical interface 182, by the camera 116, and further processed by the device 102 as described above.

In some embodiments, the process described in reference to FIG. 3 may be further performed to calibrate (e.g., determine the acceptable size of) the area 306 of the display device 114 screen. For example, the test apparatus 142 may manipulate the dimensions of the area 306, and at each change, determine a failure rate of an extraction of a QR code from the image generated by the camera 146; and adjust a size and/or resolution of the area 306 based on the determined failure rate. For example, the failure rate may reach or exceed a determined threshold; a corresponding size of the area 306 may be a minimal acceptable size to fit a graphical representation of test data and conduct testing of the device 102. In another example, the TS may start with low screen resolution and increase the resolution until the DTS may no longer recognize the pixel (or strips/lines on a display) from each other. The TS may revert to the previous resolution value to ensure robust communication. This process of may be used with the loop-back (feedback) mechanism described herein.

Graphical representation of test data may be defined, at least in part, by the characteristics of a display device of the device under test. For example, today's mobile computing device may provide a display screen with a 2K resolution (e.g., 1920*1080 pixel) and an extensive color space (e.g. three colors per eight bit) at about 30 to 60 Hz refresh rate. Accordingly, a transfer rate of displayed test data of about 355 MByte/s may be achieved. More specifically, instead of or in addition to showing a home screen or application data, the display device 114 may be used to carry trace data comprising encoded platform system state information. For example, the three color pixels may represent three bits each (three brightness levels) of test data. Following the example above, test data to be transmitted via the optical interface (e.g., 180) may reach about 1920×1080×3 pixel×3 values× 30 Hz, which results in about 22 MB/s. If concurrent user interaction while exporting test data traffic via the display is desired, only parts of the display screen may be used, utilizing space separation techniques. Alternatively, the test data may be inserted, for example, into every tenth frame to be rendered on the screen of the display device 114, thus keeping the main application on the remaining frames to keep the device 102 operational for the user.

A particular data standard application may define how test data may be converted from the binary stream into the optical space. For example, a MIPI® STP v 2.2 data stream may be as follows: FF FF FF FF FF FF FF FF FF FF 0F 0F B0 10 13 F2 78 F7 F0 42 12 08. The MIPI STP data may be interpreted as a 4-bit RGB scheme or may be combined into other sizes and interpreted as respective color values. In the MIPI® standard environment, a MIPI® STP ASYNC message may be added at the start of an optical frame to ease alignment to the MIPI® STP decoder in the test apparatus. This scheme may also be used to identify display orientation. In case of uncalibrated equipment, either a well-defined QR code or a standard-defined (e.g., MIPI®-defined) test pattern may be used for calibration of the test apparatus. The MIPI® STP v 2.2 Data Integrity Protection (DIP) may help to ensure the data is correctly received on the test apparatus. For example, the STP ASYNC repeat rate may be aligned with the frame size, e.g., at the start of a new frame the checksum of the previous frame may be provided. In general, any trace protocol may be used for the embodiments described herein. The above-mentioned protocols provide but an example of application of embodiments described herein.

Figure 4:
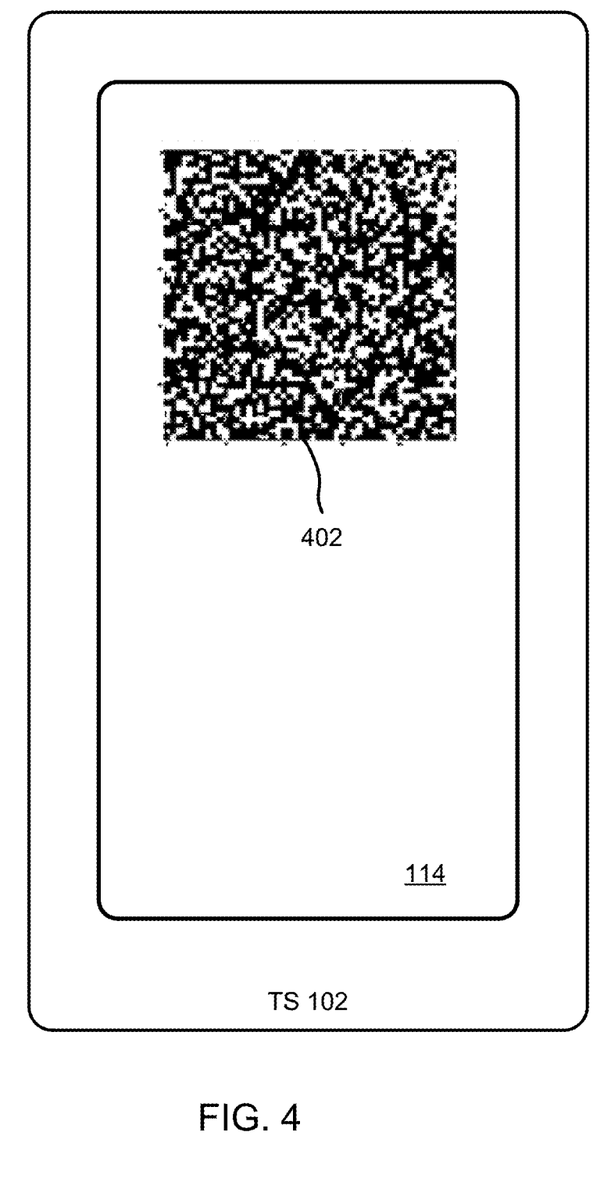
FIG. 4 is an example graphical representation of test data that may be rendered on a display screen of a device under test, in accordance with some embodiments.

FIG. 4 is an example graphical representation of test data that may be rendered on a display screen of a device under test, in accordance with some embodiments. The test data (e.g., one or more traces) may be encoded and rendered on the screen of the display device 114 of the device under test 102 as a reduced density trace picture 402. The graphical representation 402 shown in FIG. 4 may include 50×50 information points. Each information point may include several pixels in width, to cope with the environment characteristics, such as, for example, distance between camera and display, equipment quality, ambient light, and/or environmental influence such as smoke, dust, different liquids, etc.

In operation, a device under test may collect data in the frame buffer (e.g., display buffer 112) and render the test data in the graphical representation 402 on the display device 114 visible to the test apparatus for capturing via optical interface. After a given time interval (e.g., display refresh rate), the frame buffer may be flushed and reloaded with test data, which then again may be rendered on the display device 114, visible to the test apparatus.

In some embodiments, the test data may be displayed on the display device 114 in textual form and may be captured and translated by the test apparatus, for example, by scanning and converting using optical character recognition (OCR) techniques. Textual representation of the test data may be less efficient than graphical representation described above, from information density per image standpoint.

The advantages of the described embodiments may be described as follows. The described embodiments may be easy to implement in a conventional controlled environment. Specifically, no additional hardware solutions may be needed for the described embodiments. The trace infrastructure may overwrite all or parts of the frame buffer. For example, an existing frame buffer may be used as temporary storage for image data, and no additional memory may be needed to temporarily store the data without the need to have any additional synchronization or data copy methods. Further, a device display may be in use for other purposes during testing, so the testing techniques described herein may contribute negligently very to overall power consumption of the device. Also, the described embodiments may provide for scalable, flexible, and adjustable testing of a mobile computing device. For example, a full or partial display screen may be used for device testing. Alternatively, time division may be implemented to allow for testing concurrently with device use. Screen resolution may be adjusted to cope with the environmental challenges, such as ambient light, obstacles, and the like.

Further, the described embodiments may provide for use of an optical interface for device testing, which may ensure maintenance of secure and private communication between the device under test and test apparatus. Specifically, the optical interface may provide for a clear link between sender and receiver of the test and other types of data. Further, the described embodiments may provide for safe and robust communications, may cause no radio frequency (RF) issues in the absence of RF connection, and may provide for galvanic separation and absence of physical touch points between the device under test and test apparatus.

To enable testing described in reference to FIGS. 1-4, an optical interface between the device under test and test apparatus may be established. With reference to FIG. 1, the optical interface 180 between the display device 114 of the device under test 102 and camera 146 of the test apparatus 142 may be established, to enable unidirectional testing of the device 102. Further, the optical interface 182 between the display device 148 of the test apparatus 142 and the camera 116 of the device under test 102 may be established, to enable bidirectional, feedback-enabled testing of the device 102.

Figure 5:
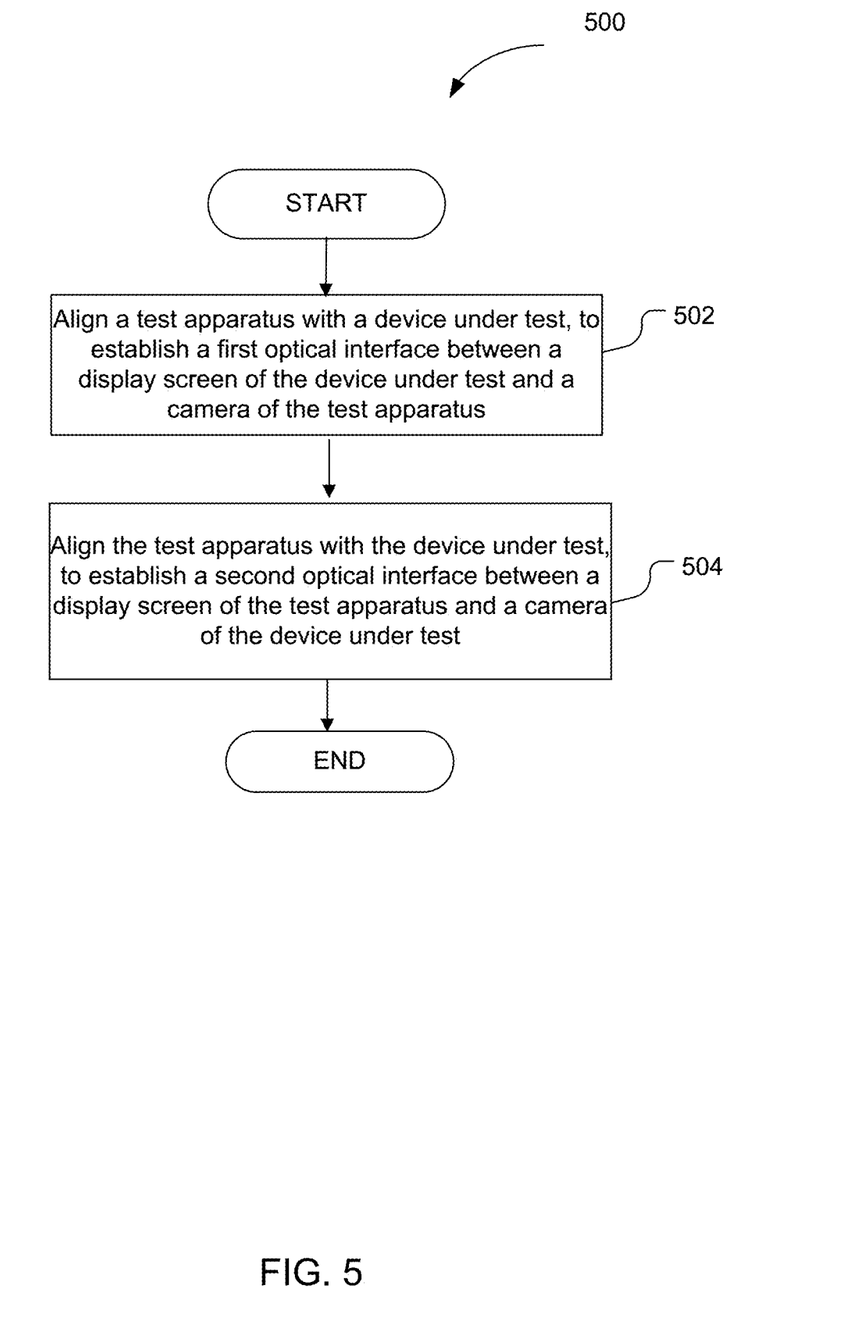
FIG. 5 is an example process flow diagram for providing an optical interface between a device under test and a test apparatus, in accordance with some embodiments.

FIG. 5 is an example process flow diagram for providing an optical interface between a device under test and a test apparatus, in accordance with some embodiments.

The process 500 may begin at block 502 and include aligning a test apparatus (e.g., 142) with a device under test (e.g., 102), to establish a first optical interface (e.g., 180). Aligning the test apparatus 142 with the device under test 102 may include disposing the test apparatus 142 or device under test 102 so as to provide a direct sightline between a screen of the display device 114 of the device under test 102 and the camera 146 of the test apparatus 142.

At block 504, the process 500 may include further aligning the test apparatus 142 with the device under test 102, to establish a second optical interface 182 between a display screen (e.g., 148) of the test apparatus and a camera (e.g., 116) of the device under test, to enable feedback optical connection between the test apparatus 142 and the device under test 102. Alignment of the test apparatus 142 with the device under test 102 may include disposing the test apparatus 142 or device under test 102 so as to provide a direct sightline between the camera 116 of the device under test 102 and a screen of the display device 114 of the test apparatus 142.

Alignment of the device under test 102 and the test apparatus 142 may include physical (e.g., mechanical) alignment, optical alignment, or a combination thereof. For example, in a controlled environment, such as production and laboratory test environment, a test rig may be set up to align the optical components (i.e., respective display device(s) and camera(s)) mechanically. The test rig may include a fixed camera display setup for the test apparatus 142. With reference to FIG. 1, the device under test 102 may be placed in a pre-formed holding feature 184 physically coupled with or embedded into the test apparatus 142 so that the physical alignment is fixed and predetermined. Because the mechanical alignment of the device 102 and test apparatus 142 may be predetermined (e.g., depending on a type, dimensions, and other parameters of the device 102), no additional and time consuming optical alignment may be required to perform testing of the device 102.

In a non-controlled environment (e.g., during a conventional use of the device 102), optical alignment between the respective cameras and display devices of the device 102 and test apparatus 142 may be performed. The optical alignment may be performed using shared, predetermined patterns embedded in the image and rendered on a display screen of the device 102. The camera of the test apparatus may align the captured image via software-based implementation, for example. The camera 146 and test controller 150 of the test apparatus 142 may focus on the pattern with a predefined geometrical shape, identify the pattern, and estimate the size and angular displacement of the image. The predefined geometrical shape may comprise, for example, three or more predefined dots rendered in the image. When the geometrical shape is in focus and the corresponding size and angle are known, the test controller 150 may correct the scaling and rotation via generic 2D image operations. In some embodiments, mechanical alignment of the device under test 102 and test apparatus 142 may be combined with optical alignment between a respective camera and a display screen.

Figure 6:
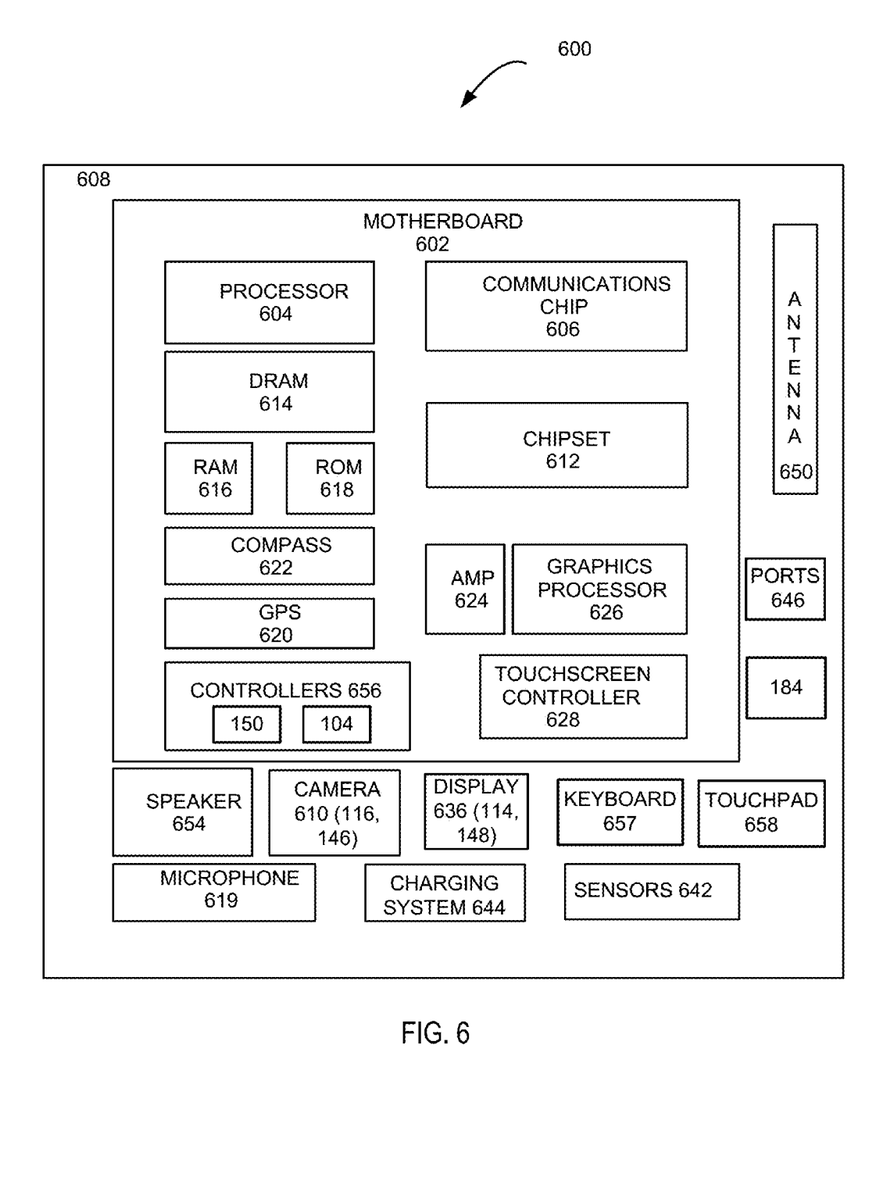
FIG. 6 illustrates an example computing device suitable for use to practice aspects of the present disclosure, in accordance with some embodiments.

FIG. 6 illustrates an example computing device 600, which may include various components described in reference to FIGS. 1-5. In some embodiments, the example computing device 600 may comprise the device under test 102 of FIG. 1. In some embodiments, the example computing device 600 may comprise the test apparatus 142 of FIG. 1. The following description of device 600 components is provided by way of example and is not limiting to this disclosure.

The computing device 600 may house a board such as motherboard 602, e.g., in housing 608. The motherboard 602 may include a number of components, including but not limited to processor 604. The processor 604 (e.g., processor 132 of device 102 or processor 152 of test apparatus 142), which may be any one of a number of known single or multicore processors known in the art, may be physically and electrically coupled to the motherboard 602.

In some implementations, the computing device 600 may include at least one communication chip 606, which may also be physically and electrically coupled to the motherboard 602. In other implementations, the communication chip 606 may be part of the processor 604. The communication chip 606 may enable wireless communications for the transfer of data to and from the computing device 600. The communication chip 606 may implement any of a number of wireless or wired standards or protocols. In some embodiments, the computing device 600 may include a plurality of communication chips 606, some of which may be dedicated to wireless communications such as Wireless Gigabit Alliance (WiGig), Wi-Fi, Bluetooth®, Global Positioning System (GPS), Enhanced Data Rates for GSM Evolution (EDGE), General Packet Radio Service (GPRS), Code Division Multiple Access (CDMA), Worldwide Interoperability for Microwave Access (WiMAX), Long Term Evolution (LTE), Evolution-Data Optimized (EV-DO) or the like, or wired communications such as Unified Serial Bus (USB) compliant, Secure Digital (SD) compliant, Peripheral Component Interconnect Express (PCIe) compliant, Thunderbolt® compliant, or compliant with some other communication and/or charging configuration.

Depending on its applications, device 600 may include other components that may or may not be physically and electrically coupled to the motherboard 602 and may be embedded with or physically and/or electrically coupled with the device 600. These other components may include, but are not limited to, volatile memory (e.g., dynamic random access memory (DRAM) 614), non-volatile memory (e.g., read only memory (ROM) 618), flash memory, random access memory (RAM) 616, a graphics processor 626, a digital signal processor, a crypto processor, a chipset 612, an antenna 650, a display 636 (e.g., 114 or 148 of the device 102 or test apparatus 142, respectively), a touchscreen controller 628, a battery/charging system 644, an audio codec, a video codec, a power amplifier 624, a GPS device 620, a compass 622, a plurality of sensors 642, a speaker 654, a camera 610 (e.g., 116 or 148 of the device 102 or test apparatus 142 respectively), a mass storage device (such as a solid-state hard drive), controllers 656, microphone 619, a keyboard 657, a touchpad 658, ports 646, and so forth.

In some embodiments, controllers 656 of device 600 may include a test data provision controller 104 of device 102 configured as described in reference to FIG. 1. In some embodiments, controllers 656 of device 600 may include a test controller 150 of test apparatus 142 configured as described in reference to FIG. 1. A number of other components may also be embedded with or coupled with the device 600, and not all of these components are illustrated in FIG. 6. For example, device 600 may include the holding feature 184 described in reference to FIGS. 1 and 5.

Example 1 may be an apparatus for device testing, comprising: a test controller to operate a camera to generate an image to capture test data displayed on a screen of a device under test, wherein the test controller is to extract the test data from the image, analyze the test data, and generate feedback information for the device under test, based at least in part on a result of the analysis of the test data.

Example 2 may include the subject matter of Example 1, wherein the displayed test data comprises a graphical, visual, or textual representation of test information generated by the device under test.

Example 3 may include the subject matter of Example 1, wherein the test data includes run-control information associated with one or more components of the device under test.

Example 4 may include the subject matter of Example 3, wherein the test data further includes one or more traces generated in accordance with a trace protocol, wherein the trace protocol is one of a System Trace Protocol (STP) or Trace Wrapper Protocol (TWP) of a MIPI® Specification.

Example 5 may include the subject matter of Example 1, wherein the apparatus further comprises a display device coupled with the test controller, to display the feedback information on a screen of the display device, to be captured by a camera of the device under test.

Example 6 may include the subject matter of Example 1, wherein the test controller to extract and analyze the test data from the image includes to convert pixel information of the image into a binary data stream, and to determine whether the binary data stream includes error messages or whether the binary data stream deviates from a predefined data flow.

Example 7 may include the subject matter of Example 1, wherein the test controller is to determine an area on the screen of the device under test in which the test data is to be displayed.

Example 8 may include the subject matter of Example 7, wherein the test controller to determine an area on the screen of the device under test in which the test data is to be displayed includes to: determine a failure rate of an extraction of a subset of the test data; and adjust at least one of a size or resolution of the area based at least in part on the determined failure rate.

Example 9 may include the subject matter of any of Examples 1 to 8, wherein the device under test comprises a mobile computing device.

Example 10 may include the subject matter of any Examples 1 to 8, wherein the apparatus includes the camera, wherein the test controller is coupled with the camera, to operate the camera.

Example 11 may be a computing device with integral device testing, comprising: a test data provision controller to operate a display device with a screen to generate and display test data on the screen, wherein the test data is to provide information associated with one or more components of the computing device to be tested; wherein the test data provision controller is to further operate a camera to generate an image to capture feedback information provided on a screen of a test apparatus in response to a result of analysis of the test data by the test apparatus; wherein the test data provision controller is to extract the feedback information from the image, analyze the feedback information, and respond to one or more instructions included in the feedback information.

Example 12 may include the subject matter of Example 11, wherein the device comprises a mobile computing device, wherein the test data includes one or more traces, including at least one of: a device processor trace, a device software instrumentation trace, or a device hardware instrumentation trace.

Example 13 may include the subject matter of any Examples 11 to 12, wherein the test data provision controller includes a trace source block, to generate one or more traces; and a run-control block coupled with the trace source block, to generate run-control information, including to generate updated run-control information in response to the one or more instructions included in the feedback information.

Example 14 may be a method for integral device testing via an optical interface, comprising: generating, by a test apparatus, an image to capture test data provided on a display screen of a device under test, the test data providing information associated with one or more components of the device to be tested; extracting and analyzing, by the test apparatus, the test data from the image; and generating, by the test apparatus, feedback information for the device under test, based at least in part on a result of the extracting and analyzing the test data.

Example 15 may include the subject matter of Example 14, further comprising: providing, by the test apparatus, the feedback information, on a display screen of the test apparatus, for capturing by the device under test.

Example 16 may include the subject matter of Example 14, wherein extracting and analyzing the test data includes: converting, by the test apparatus, a graphical representation of the test data that comprises pixel information, into a binary data stream comprising device status information; and determining, by the test apparatus, whether the binary data stream includes error messages or whether the binary data stream deviates from a predefined data flow.

Example 17 may include the subject matter of any Examples 14 to 16, further comprising: determining, by the test apparatus, an area on the display screen of the device under test in which the test data is to be displayed, wherein the device under test comprises a mobile device.

Example 18 may include the subject matter of Example 17, wherein determining an area includes: identifying, by the test apparatus, a size of the area on the display screen of the device under test in which a graphical or textual representation of test data is to be displayed, based at least in part on a determined error rate of the conversion of the graphical or textual representation into a binary data stream.

Example 19 may be a method for providing an optical interface between a device under test and a test apparatus, comprising: aligning a test apparatus with a device under test, to establish a first optical interface between a display screen of the device under test and a camera of the test apparatus, to enable test data transfer from the device under test to the test apparatus; and further aligning the test apparatus with the device under test, to establish a second optical interface between a display screen of the test apparatus and a camera of the device under test, to enable feedback optical connection between the test apparatus and the device under test.

Example 20 may include the subject matter of Example 19, wherein aligning a test apparatus with a device under test includes disposing one of the test apparatus or device under test to provide a direct sightline between the display screen of the device under test and the camera of the test apparatus.

Example 21 may include the subject matter of Example 19, wherein further aligning the test apparatus with the device under test includes disposing one of the test apparatus or device under test to provide a direct sightline between the camera of the device under test and the display screen of the test apparatus.

Example 22 may be an apparatus for integral device testing via an optical interface, comprising: means for generating an image to capture test data provided on a display screen of a device under test, the test data providing information associated with one or more components of the device to be tested; means for extracting and analyzing the test data from the image; and means for generating feedback information for the device under test, based at least in part on a result of the extracting and analyzing the test data.

Example 23 may include the subject matter of Example 22, further comprising means for providing the feedback information, on a display screen of the test apparatus, for capturing by the device under test.

Example 24 may include the subject matter of Example 22, wherein means for extracting and analyzing the test data includes: means for converting a graphical representation of the test data that comprises pixel information, into a binary data stream comprising device status information; and means for determining whether the binary data stream includes error messages or whether the binary data stream deviates from a predefined data flow.

Example 25 may include the subject matter of Example 11, wherein the computing device includes the camera and the display device, wherein the test provision controller is coupled with the camera and the display device.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for device testing, comprising:
   a camera to capture test data generated by a device under test and displayed on a screen of a display device of the device under test, wherein the camera of the apparatus and the display device of the device under test form a first optical interface between the apparatus and the device under test, wherein the test data generated by the device under test includes one or more traces including: one or more software instrumentation traces that include error information associated with software applications residing on the device under test, or one or more hardware instrumentation traces that include messages triggered by transactions associated with hardware modules of the device under test;
   a display device to display a feedback information for the device under test, wherein the feedback information is to be captured by a camera of the device under test, wherein the display device of the apparatus and the camera of the device under test form a second optical interface between the apparatus and the device under test; and
   a test controller to operate the camera and the display device, wherein the test controller is to extract the test data from an image, analyze the test data and generate the feedback information for the device under test, based at least in part on a result of the analysis of the test data, wherein the feedback information includes instructions to the device under test to correct errors, wherein the instructions are generated based on a result of the analysis of the error information included in the test data.

2. The apparatus of claim 1, wherein the displayed test data comprises a graphical, visual, or textual representation of test information generated by the device under test.

3. The apparatus of claim 1, wherein the test data further includes run-control information associated with one or more components of the device under test.

4. The apparatus of claim 3, wherein the one or more traces are generated in accordance with a trace protocol, wherein the trace protocol is one of a System Trace Protocol (STP) or Trace Wrapper Protocol (TWP) of a MIPI Specification.

5. The apparatus of claim 1, wherein the test controller to extract and analyze the test data from the image includes to convert pixel information of the image into a binary data stream, and to determine whether the binary data stream includes error messages or whether the binary data stream deviates from a predefined data flow.

6. The apparatus of claim 1, wherein the test controller is to determine an area on the screen of the device under test in which the test data is to be displayed.

7. The apparatus of claim 6, wherein the test controller to determine an area on the screen of the device under test in which the test data is to be displayed includes to:
   determine a failure rate of an extraction of a subset of the test data; and
   adjust at least one of a size or resolution of the area based at least in part on the determined failure rate.

8. The apparatus of claim 1, wherein the device under test comprises a mobile computing device.

9. A device under test, comprising:
   a display device with a screen to display test data on the screen, to be captured by a camera of an apparatus for device testing, wherein the test data is to provide information associated with one or more components of a computing device to be tested, wherein the test data includes one or more traces including: one or more software instrumentation traces that include error information associated with software applications residing on the device under test, or one or more hardware instrumentation traces that include messages triggered by transactions associated with hardware modules of the device under test, wherein the camera of the device testing apparatus and the display device of the device under test form a first optical interface between the device testing apparatus and the device under test;
   a camera to capture feedback information generated by the device testing apparatus for the device under test and displayed by a display device of the device testing apparatus, wherein the feedback information includes instructions to the device under test to correct errors, wherein the instructions are generated based on a result of an analysis of the error information included in the test data, wherein the display device of the device testing apparatus and the camera of the device under test form a second optical interface between the device testing apparatus and the device under test; and a test data provision controller coupled with the display device and the camera of the device under test, to;

generate the test data and provide the test data for rendering on the screen of the display device, operate the camera to generate an image to capture the feedback information provided by the device testing apparatus, and extract the feedback information from the image, analyze the feedback information, and respond to one or more instructions included in the feedback information.

10. The device under test of claim 9, wherein the device under test comprises a mobile computing device, wherein the test data further includes at least one processor trace, a device software instrumentation trace, or a device hardware instrumentation trace.

11. The device under test of claim 9, wherein the test data provision controller includes a trace source block, to generate the one or more traces; and a run-control block coupled with the trace source block, to generate run-control information, including to generate updated run-control information in response to the one or more instructions included in the feedback information.

12. A method for device testing, comprising:

causing, by a test apparatus, a camera of the test apparatus to generate an image to capture test data provided on a display screen of a display device of a device under test, the test data providing information associated with one or more components of the device to be tested, the test data including one or more traces that include: one or more software instrumentation traces that include error information associated with software applications residing on the device under test, or one or more hardware instrumentation traces that include messages triggered by transactions associated with hardware modules of the device under test, the camera of the test apparatus and the display device of the device under test forming a first optical interface between the test apparatus and the device under test;

extracting and analyzing, by the test apparatus, the test data from the image; and generating, by the test apparatus, feedback information for the device under test, based at least in part on a result of the extracting and analyzing the test data, the generating including producing instructions to the device under test to correct errors, based on a result of analyzing the error information included in the test data; and providing, by the test apparatus, the feedback information on a display device of the test apparatus, for capturing by a camera of the device under test, the display device of the test apparatus and the camera of the device under test forming a second optical interface between the test apparatus and the device under test.

13. The method of claim 12, wherein extracting and analyzing the test data includes:

converting, by the test apparatus, a graphical representation of the test data that comprises pixel information, into a binary data stream comprising device status information; and determining, by the test apparatus, whether the binary data stream includes error messages or whether the binary data stream deviates from a predefined data flow.

14. The method of claim 12, further comprising:

determining, by the test apparatus, an area on the display screen of the device under test in which the test data is to be displayed, wherein the device under test comprises a mobile device, wherein determining an area includes: identifying, by the test apparatus, a size of the area on the display screen of the device under test in which a graphical or textual representation of test data is to be displayed, based at least in part on a determined error rate of a conversion of the graphical or textual representation into a binary data stream.

15. The method of claim 12, further comprising:

aligning the test apparatus with the device under test, to establish the first optical interface between the display screen of the device under test and the camera of the test apparatus, to enable test data transfer from the device under test to the test apparatus; and further aligning the test apparatus with the device under test, to establish the second optical interface between the display device of the test apparatus and the camera of the device under test, to enable transfer of the feedback information between the test apparatus and the device under test.

16. The method of claim 15, wherein aligning the test apparatus with the device under test includes disposing one of the test apparatus or device under test to provide a direct sightline between the display screen of the device under test and the camera of the test apparatus, wherein further aligning the test apparatus with the device under test includes disposing one of the test apparatus or device under test to provide a direct sightline between the camera of the device under test and the display screen of the test apparatus.

* * * * *